Figure 1:
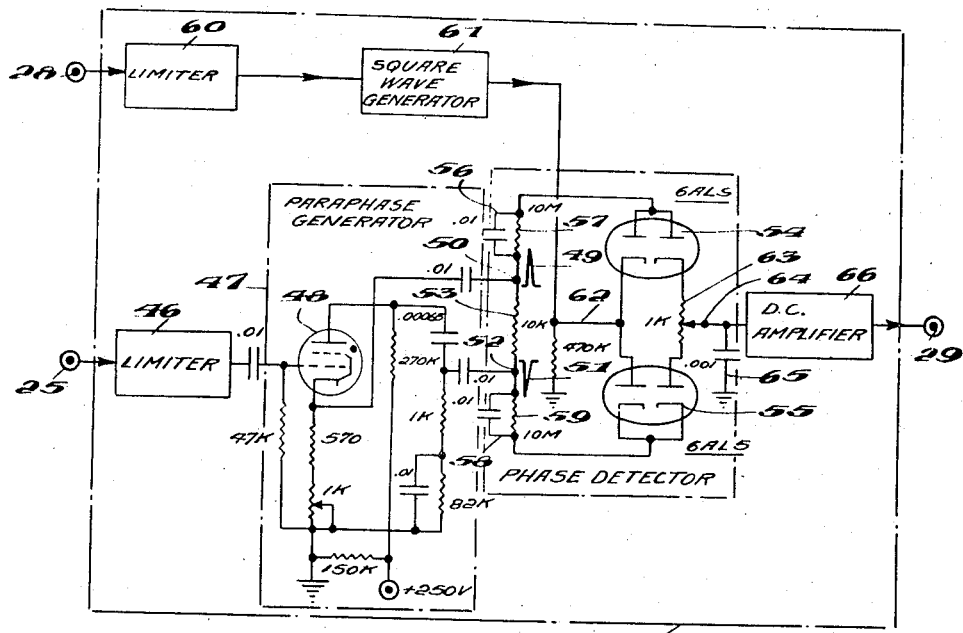

Dec. 30, 1958    M. J. MINNEMAN ET AL    2,866,893
PULSE TIME COMPARATOR
Original Filed Sept. 18, 1950

INVENTORS
MILTON J. MINNEMAN
ARTHUR S. WESTNEAT, Jr.

BY Julian C. Renfro
ATTORNEY

United States Patent Office 2,866,893
Patented Dec. 30, 1958

2,866,893

PULSE TIME COMPARATOR

Milton J. Minneman, Baltimore, Md., and Arthur S. Westneat, Jr., Franklin Township, Somerset County, N. J., assignors to The Martin Company, a corporation of Maryland Original application September 18, 1950, Serial No. 185,448. Divided and this application December 30, 1952, Serial No. 329,528

7 Claims. (Cl. 250—27)

This invention relates to an improved pulse time comparator, this application being a division of our co-pending application, Serial No. 185,448, filed September 18, 1950, and entitled "Synchronization System."

In certain applications in the field of electronics, it is desired that substantially perfect synchronization be maintained between two series of pulses emanating from separate sources. One way to accomplish this result is to provide a suitable pulse time comparator adapted to compare the time of arrival of pulses from the two separate sources and in response to any time difference therebetween, capable of producing an output indicative of the relative order of the pulses and the amount of time difference therebetween. The output from the comparator can then be employed in a known fashion to control the timing of one or both of the pulse sources so as to restore its true synchronism. To be useful in certain applications, such as the synchronization system disclosed and claimed in the aforesaid co-pending application where a high degree of accuracy is required, such a device must be capable of detecting extremely small time differences in the order of a few billionths of a second and be capable of producing a useful output signal in response to such minute errors.

It is, therefore, an object of this invention to provide such a pulse time comparator which is of relatively simple construction but which will provide the desired high degree of sensitivity in detecting any lack of synchronization between a pair of input pulses applied thereto.

It is a further object of this invention to provide such a pulse comparator of extreme accuracy which is capable of producing a useable error signal output whenever the time differences between two pulses to be compared therein exceeds a value of one or two billionths of a second.

Further and other objects and advantages will appear from a consideration of the following description and drawing.

Figure 2:
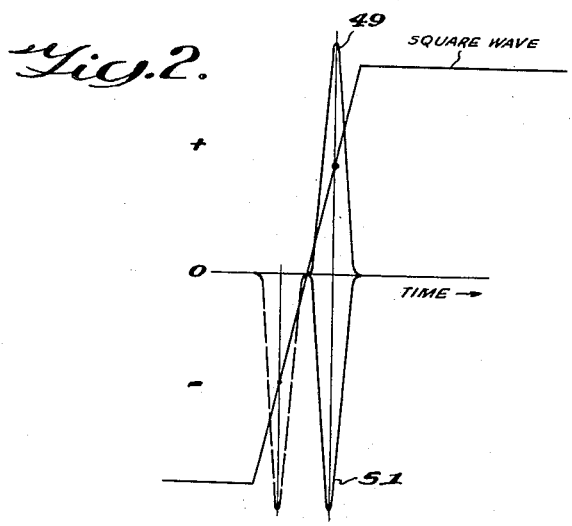

In the drawing:

Figure 1 illustrates an improved pulse comparator according to this invention; and Figure 2 illustrates a greatly expanded leading edge of a typical square wave utilized in conjunction with this invention, with peaked pulses superimposed thereon for illustrating the relative phases of and the time differences between input pulses.

The pulse comparator of the invention consists broadly of a pair of limiters, one for each pulse, a square wave generator triggered by one of the limited pulses, a paraphase generator triggered by the other limited pulse, and a balanced phase detector responsive to relative time differences between the output of the square wave generator and that of the paraphase generator to provide an output voltage proportional to the time difference. More specifically, one of the pulses, for example, the pulse supplied to terminal 25, is applied to a limiter 46 which will provide an output pulse the magnitude and shape of which will be substantially independent of the magnitude and shape of the incoming pulse. The output pulse from the limiter 46 is applied to the control grid of a thyratron 48, included in the paraphase generator 47, causing the thyratron to "fire." As clearly indicated in the diagram, the paraphase generator is so arranged as to produce under these circumstances a very short, highly peaked, positive-going output pulse 49, derived from the cathode of the thyratron and appearing at its output terminal 50. Simultaneously there will appear, at its other output terminal 52, a similar, negative-going output pulse 51, derived from the plate circuit of the tube. Points 50 and 52 are connected together by a load resistor 53 and it is obvious therefore that the voltage represented by the pulses 49 and 51 will be impressed directly across this resistor in the form of a balanced output pulse. The peaks of these pulses will always bear a definite time relation with the leading edge of the input pulse applied to terminal 25. Suitable capacitors are provided in the circuit of tube 48, which, when discharged as a result of the firing of the tube, cause the voltage across the tube to drop to a value below which conduction cannot be supported.

The positive pulse 49 is applied to the plates of one of a pair of dual rectifiers 54 and 55 which are connected as a balanced phase detector. The negative pulse 51 is similarly applied to the cathodes of the rectifier 55 as clearly shown. Under these conditions, current will flow through the rectifiers in series with one another and will produce corresponding voltage drops across the resistors 57 and 59. This voltage drop will be applied across, and charge, the condensers 56 and 58. As soon as the voltage in the pulses begins to drop to a lower value, the tubes 54 and 55 will become non-conductive due to the charges stored in the condensers 56 and 58. The relative size of the condensers 56 and 58 and of the resistors 57 and 59 is such that the resistors will permit but a slight discharge of the condensers during the interval between successive input pulses. Thus during the following cycles the tubes 54 and 55 will be conductive only for a very brief instant corresponding to the rise time of the extreme peak portions of the pulses 49 and 51.

The other input pulse to the comparator is applied at 28 to its limiter 60 and the limited output therefrom is used to trigger a square wave generator 61 having a square wave output at a frequency corresponding to the pulse repetition rate of the pulses, the positive and negative-going slopes of the square wave being extremely steep. These square waves are applied as at 62 between one cathode of dual rectifier 54 and the associated plate of rectifier 55. A potentiometer 63 is connected between the other cathode of tube 54 and the other anode of tube 55 and the potentiometer arm 64 is so adjusted that, when the peak of the pulses 49 and 51 occurs exactly at the same instant that the voltage from the square wave output at a frequency corresponding to the put voltage at 64 will be zero. If the input pulse at input terminal 25 occurs slightly later than the input pulse at input terminal 28, the peaks of the pulses 49 and 51 will also occur slightly later than the zero point of the square wave, with the result that there will be produced a voltage at the arm 64 proportional to the point on the slope of the square wave pulse at which the peak 49 occurs. Conversely, if the pulse at terminal 25 leads pulse 28, the voltage at 64 will be in the opposite sense, since the peak will then appear when the voltage at the leading edge of the square wave will be on the opposite side of zero potential. Condenser 65 serves to store up and smooth out the instantaneous output voltage at 64 and then these smoothed voltages are applied to the DC amplifier 66, the output 29 of which is in the form of a direct current voltage having a polarity dependent upon the time relationship of the two pulses and a magnitude corresponding to the magnitude of this difference.

By providing the thyratron 48 connected as shown in Figure 4, it is possible to obtain a "push-pull" or balanced input for the balanced phase detector, the pulses of which have an extremely short rise time. It is to a large extent due to this arrangement that the extreme time-sensitivity of the comparator is obtainable. Were an attempt made to use a balanced output transformer between the pulse generator and the phase detector, it would be impossible to obtain the necessary short rise time due to the inductance present in such a transformer.

Referring to Figure 2, if the input pulse applied to terminal 25 of Figure 1 occurs slightly later than the input pulse applied at terminal 28, the peaks of pulses 49 and 51 will also occur slightly later than the zero point of the square wave, with the result that there will be produced at arm 64 a voltage proportional to the point on the slope of the square wave pulse at which the peak of pulse 49 (or 51) occurs. Note in Figure 2 the intercept point of pulse 49 on the square wave. Any time difference between input pulses is indicated by a voltage proportional to the difference in time between the zero intercept of the square wave and the peak of pulse 49 (or 51). The proportionality constant is determined by the rise time of the square wave. It is to be further noted that lag or lead between pulses is determined by a negative or positive polarity supplied by the square wave. Thus when the input pulse at terminal 25 leads the input pulse at terminal 28, the intercept on the square wave is negative, as indicated in Figure 2 by the pulse in dashed lines.

While but one form of the device has been shown and described specifically in this application, it is obvious that many changes and modifications could be made without departing from the principle of the invention or the scope and spirit of the appended claims.

We claim as our invention:

1. A pulse time comparator for determining the time difference between a pair of input pulses, each pulse being a member of a series of pulses, comprising means responsive to one of said input pulses for generating a square voltage wave having a relatively steeply rising wave front, means responsive to the other of said input pulses for generating a sharply peaked, short duration pulse, said peak pulse being of less duration than the rise time of said square wave and occurring within the interval of the rise time of said square wave, and a phase detector responsive to said peaked pulse and said square wave for sensing the instantaneous polarity and magnitude of the voltage of said square wave during transition between voltage levels and during the time said peaked pulse is at or near its peak, and providing an output voltage substantially proportional to said polarity and magnitude of the instantaneous voltage, whereby said output will have a polarity and amplitude corresponding to the relative phase of and the time difference between said input pulses.

2. A pulse time comparator for determining the time difference between a pair of input pulses, each pulse being a member of a series of pulses, comprising means responsive to one of said input pulses for generating a square voltage wave having a relatively steeply rising wave front, means responsive to the other of said input pulses for generating a sharply peaked, short duration pulse, said peak pulse being of less duration than the rise time of said square wave and occurring within the interval of the rise time of said square wave, and a phase detector responsive to said peaked pulse and said square wave for sensing the instantaneous polarity and magnitude of the voltage of said square wave during transition between voltage levels and during the time said peaked pulse is at or near its peak, and providing an output voltage substantially proportional to said polarity and magnitude of the instantaneous voltage, said square wave generator and said peaked pulse generator being so adjusted that, when said input pulses occur simultaneously, said peaked pulse voltage peak occurs as the square wave voltage is passing through zero, whereby said output will have a polarity and amplitude corresponding to the relative phase of and the time difference between said input pulses.

3. A pulse time comparator for determining the time difference between a pair of input pulses, each pulse being a member of a series of pulses, comprising a thyratron having a control grid, cathode, and anode, a power source for said thyratron, impedances connected between said power source and said cathode and anode respectively, means for applying one of said input pulses to the grid of said thyratron to trigger said thyratron whereby to produce simultaneously a sharply peaked voltage pulse at each of said cathode and anode, a square wave generator controlled by said other input pulse to produce a voltage wave having a relatively steeply rising wave front, and a phase detector responsive to said peaked voltage pulses and said square wave for sensing the instantaneous polarity and amplitude of the voltage of said square wave during transition between voltage levels and during the time said peaked pulse is at or near its peak.

4. A pulse time comparator for comparing the time difference between a pair of input pulses, each pulse being a member of a series of pulses, comprising a thyratron having an anode, cathode, and control grid, means for applying one of said input pulses to said control grid, a power source for said thyratron, and resistors connected between said source and said cathode and anode respectively, a load network, and means connecting said load network to said cathode and anode respectively for producing highly peaked, opposed voltage pulses at the ends of said load resistor upon firing of said thyratron, a pair of series connected rectifiers, means connecting said rectifiers across said load resistor whereby said rectifiers will be conductive only during the peak voltage portions of said voltage pulses, means responsive to said other input pulse for generating a steep sided voltage square wave, means for applying said square wave to the connection between said rectifiers, and impedance means controlled by the difference in current flowing in said rectifiers for sensing the instantaneous value of said square wave voltage during transition between voltage levels and during the time said peaked pulses are at or near their peak.

5. A pulse time comparator for determining the time difference between a pair of input pulses, each pulse being a member of a series of pulses, comprising means responsive to one of said input pulses for generating a square voltage wave having a relatively steeply rising wave front, means responsive to the other of said input pulses to generate simultaneously a pair of oppositely sensed, sharply peaked, short duration pulses, and a phase detector responsive to said peaked pulses and said square wave for sensing the instantaneous polarity and magnitude of the voltage of said square wave during transition between voltage levels and during the time said peaked pulses are at or near their peak and providing an output substantially proportional to the said polarity and magnitude of the square wave, whereby said output will have a polarity and amplitude corresponding to the relative phase of and the time difference between said input pulses.

6. A pulse time comparator for determining the time difference between a pair of input pulses, each pulse being a member of a series of pulses, comprising means responsive to one of said input pulses for generating a square voltage wave having a relatively steeply rising wave front, means responsive to the other of said input pulses to generate simultaneously a positive and a negative voltage pulse, each of the last-mentioned pulses being sharply peaked and of short duration, a first and a second double diode, individual means connecting each cathode of the first double diode to a respective anode of the second double diode, one of said individual connecting means including a voltage divider device, elements connected to the other individual connecting means to apply the square wave to said other individual connecting means, means to apply said positive pulse simultaneously to both anodes of the first double diode, means to apply said negative pulse simultaneously to both cathodes of said second double diode, each of the said means for applying the pulses to the double diodes including circuitry for holding the diodes non-conducting except at the peak of the voltage pulses, whereby the output at said voltage divider will have polarity and amplitude corresponding to the relative phase of and the time difference between the said input pulses.

7. A pulse time comparator for comparing the time difference between a pair of input pulses, each pulse being a member of a series of pulses, comprising a thyratron having a cathode, an anode, and a control grid, means for applying one of the input pulses to said grid, circuitry elements connected to said thyratron to produce a short, sharply peaked positive pulse and a short, sharply peaked negative pulse when an input pulse is applied to the grid, a load resistor connected to have the positive pulse appear at one terminal and the negative pulse at the other terminal; a first and a second double diode, individual means connecting each cathode of the first double diode to a respective anode of the second double diode, one of said individual connecting means including a voltage divider device, elements connected to the other individual connecting means to apply a voltage wave having a relatively steeply rising wave front to said other individual connecting means, common means connecting the anodes of the first double diode to the positive pulse terminal of the load resistor, common means connecting both cathodes of the second double diode to the negative pulse terminal of the load resistor, each of the two said common means including a capacitor and a resistor in parallel, whereby the output at the voltage divider will have polarity and amplitude corresponding to the relative phase of and time difference between the said input pulses.

References Cited in the file of this patent

UNITED STATES PATENTS

| | | |
|---|---|---|
| 2,458,156 | Fredendall | Jan. 4, 1949 |
| 2,482,544 | Jacobsen | Sept. 20, 1949 |
| 2,499,613 | Thompson | Mar. 7, 1950 |
| 2,631,239 | Lower | Mar. 10, 1953 |

FOREIGN PATENTS

| | | |
|---|---|---|
| 124,503 | Australia | Oct. 10, 1946 |
| 124,653 | Australia | Sept. 9, 1946 |

UNITED STATES PATENT OFFICE

CERTIFICATE OF CORRECTION

December 30, 1958

Patent No. 2,866,893

Milton J. Minneman et al.

It is hereby certified that error appears in the printed specification of the above numbered patent requiring correction and that the said Letters Patent should read as corrected below.

Column 2, lines 54 and 55, strike out the words "square wave output at a frequency corresponding to the put" and insert instead -- square wave generator is passing through zero, the output --.

Signed and sealed this 16th day of June 1959.

(SEAL)
Attest:

KARL H. AXLINE

Attesting Officer

ROBERT C. WATSON
Commissioner of Patents